US008735517B2

(12) United States Patent
Morgan et al.

(10) Patent No.: US 8,735,517 B2
(45) Date of Patent: May 27, 2014

(54) POLYMERIZATION REACTOR AND RELATED PROCESS

(75) Inventors: Christopher K. Morgan, Pearland, TX (US); Shiraz A. H. Pradhan, London (GB); Michael W. Ackman, Zachary, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 237 days.

(21) Appl. No.: 13/151,817

(22) Filed: Jun. 2, 2011

(65) Prior Publication Data

US 2012/0309912 A1 Dec. 6, 2012

(51) Int. Cl.
*C08F 2/00* (2006.01)
*B01J 19/18* (2006.01)
*C08F 236/02* (2006.01)

(52) U.S. Cl.
USPC .............. 526/88; 526/918; 422/131; 422/135

(58) Field of Classification Search
USPC .............. 526/88, 918; 422/135, 131; 384/103
See application file for complete search history.

(56) References Cited

U.S. PATENT DOCUMENTS

| | | | |
|---|---|---|---|
| 3,726,843 A | | 4/1973 | Anolick et al. |
| 6,329,477 B1 | | 12/2001 | Harrington et al. |
| 6,806,336 B2 | | 10/2004 | Ravishankar |
| 6,881,800 B2 | | 4/2005 | Friedersdorf |
| 7,074,364 B2 * | | 7/2006 | Jahn et al. .................. 422/62 |
| 7,135,533 B2 | | 11/2006 | Ravishankar |
| 7,585,917 B2 | | 9/2009 | Datta et al. |
| 7,915,354 B2 | | 3/2011 | Wouters et al. |
| 8,148,480 B2 * | | 4/2012 | Carloff et al. .................. 526/88 |
| 2009/0005520 A1 * | | 1/2009 | Kiss et al. .................. 526/64 |

FOREIGN PATENT DOCUMENTS

EP 0 552 945 7/1993

OTHER PUBLICATIONS

EKATO, "HWL Industrial Agitators," EKATO Schopfheim, Germany, 1996, 1-6.*
EKATO, "EKATO ESD," EKATO Schopfheim, Germany, Jan. 8, 2005, 1-4.*

* cited by examiner

*Primary Examiner* — Fred M Teskin (57) ABSTRACT

Provided is a stirred tank polymerization reactor system having a reactor tank, a stirring assembly including a rotatable shaft that extends through a wall of the tank, and a triple barrier mechanical seal. The mechanical seal includes an outer cylinder mounted in the wall of the tank, an inner cylinder that is rotatable relative to the outer cylinder and connected to the shaft, and first, second, and third fluid barrier seals mounted between the outer and inner cylinders at different positions along the axis of rotation of the inner cylinder. First and second sources of pressurized barrier fluid are connected between the first and second pressure fluid barrier seals and the second and third barrier seals, respectively. The three barrier seals advantageously "step down" the differential pressure experienced by the uppermost barrier seals, substantially reducing mechanical stresses experienced by the annular sealing rings and seats. The mechanical seal can further include a closed loop cooling channel in its outer cylinder that is connected to a circulating source of cooling fluid.

23 Claims, 6 Drawing Sheets

POLYMERIZATION REACTOR AND RELATED PROCESS

FIELD OF THE INVENTION

This invention generally relates to stirred tank reactors. More specifically, the invention relates to a stirred tank reactor having a triple barrier mechanical seal that rotatably mounts the shaft of a stirrer in the top wall of the reactor tank, and processes related thereto.

BACKGROUND OF THE INVENTION

Stirred tank polymerization reactors for producing, for example, ethylene-propylene-diene (EPDM) elastomers are generally known. Such reactors generally comprise a reactor tank, and a stirring assembly including a motor-driven shaft that drives an array of paddles in the interior of the tank. The shaft of the stirring assembly is typically rotatably and sealingly mounted in the reactor tank by means of a mechanical seal. Such seals usually include an outer cylindrical shell that is fixedly mounted in the top wall of the tank, and an inner cylindrical shell that is rotatable within the outer shell and affixed to the motor-driven shaft of the stirring assembly. The inner cylindrical shell generally includes a pair of sealing rings which are spaced apart along its axis of rotation. Each of the sealing rings is typically spring-biased against an annular sealing seat fixedly mounted in the outer sealing ring. A pressurized source of barrier fluid, which may be mineral oil, is connected to an annular space defined between the inner diameter of the outer ring and the outer diameter of the inner ring.

In operation, a flow of monomer is introduced into the interior of the tank along with a catalyst. At the same time, the shaft of the stirring assembly is rotatably driven by a motor so that the paddle array continuously agitates the monomer and catalyst, thereby promoting the reaction of the monomer into polymers such as EPDM elastomers. During this process, the fluid contents of the tank is typically subjected to both elevated pressures, e.g., on the order of 120 bars, which adiabatically generates elevated temperatures, e.g., around 400° F.-500° F. (204° C.-260° C.). In order to prevent the fluid contents of the tank from contaminating the barrier fluid used in the mechanical seal, the barrier fluid is usually pressurized to a level slightly above that of the reaction tank. Moreover, in order to protect the lowermost sealing ring and sealing seat from elevated temperatures generated within the reaction tank, a "seal flush" flow of externally-supplied monomer of about two to three gallons per minute is typically provided at the vicinity of the lowermost sealing ring and sealing seat.

While the aforementioned mechanical seal prevents leakage of the reactor contents during polymer production, the applicants have observed that such seals can effectively function only for a limited period, e.g., about eight or nine months, which often makes the seals the limiting component of reactor overhauls. Consequently, the applicants' experience has been that the reactor would need to be completely shut down every eight or nine months solely for the purpose of replacing the seal. The resulting downtime and disruptions in production significantly increase the costs of the final products.

Close inspection of worn seals by the applicants have revealed the presence of spalling on the interfacing surfaces between the sealing rings and sealing seats. The applicants believe such spalling is caused by the combination of mechanical and thermal stresses that the sealing rings and seats are subjected to during operation. In particular, the applicants have determined that lowermost sealing ring and sealing seat are subjected to high temperatures due to their constant exposure to the fluid contents of the reactor tank (despite the continuous use of the aforementioned seal flush to lower these temperatures), while the uppermost sealing ring and sealing seat are constantly subjected to a high differential pressure (i.e., the difference between the pressure of the barrier fluid and the ambient atmospheric pressure to which the barrier fluid ultimately flows).

SUMMARY OF THE INVENTION

The stirred tank polymerization reactor of the invention addresses the aforementioned problems. To this end, the stirred tank polymerization reactor of the invention comprises a tank (e.g., for containing polymer-producing compounds at elevated pressures and temperatures); a stirring assembly including a rotatable shaft that extends through a wall of the tank; a mechanical seal including an outer cylinder mounted in the wall of the tank, an inner cylinder that is rotatable relative to the outer cylinder and connected to the shaft, and first, second, and third fluid barrier seals mounted between the outer and inner cylinders at different positions along the axis of rotation of the inner cylinder, with the first barrier seal being closest to the reactor tank. First and second sources of pressurized barrier fluid are connected between the first and second pressure fluid barrier seals and the second and third barrier seals, respectively. The first barrier fluid source supplies barrier fluid at a higher pressure than a maximum pressure within the tank and said second barrier fluid source supplies barrier fluid between about 40%-60%, preferably about 45%-55%, more preferably about 50%, of the pressure of the first barrier fluid, preferably such that sealing friction forces applied to the second and third fluid barrier seals are substantially equal, i.e., the sealing friction forces applied to the second and third fluid barrier seals differ by no more than 20% of the higher sealing friction force.

The use of three barrier seals advantageously "steps down" the differential pressure experienced by the uppermost barrier seals and effectively halves the differential pressure experienced by the uppermost barrier seal in convention designs. This in turn substantially reduces the mechanical forces experienced by the uppermost annular sealing rings and seats.

The mechanical seal can further include a closed loop cooling channel in the outer cylinder, and a source of cooling fluid connected to the channel. The use of a closed loop channel not only solves the aforementioned problems associated with the unaccounted monomer stream used in the seal flush system, but further allows more efficient coolants to be used along with substantially higher coolant flow rates, thereby providing much better thermal protection of the lowermost barrier seal.

The resulting stirred tank polymerization reactor of the invention is observed to be capable of producing polymer product without the need for seal-replacing shutdowns for longer periods, e.g., two years or more as compared with the eight or nine month seal-replacing shutdowns for previously used stirred tank polymerization reactors.

DETAILED DESCRIPTION OF THE EMBODIMENTS

Figure 1:
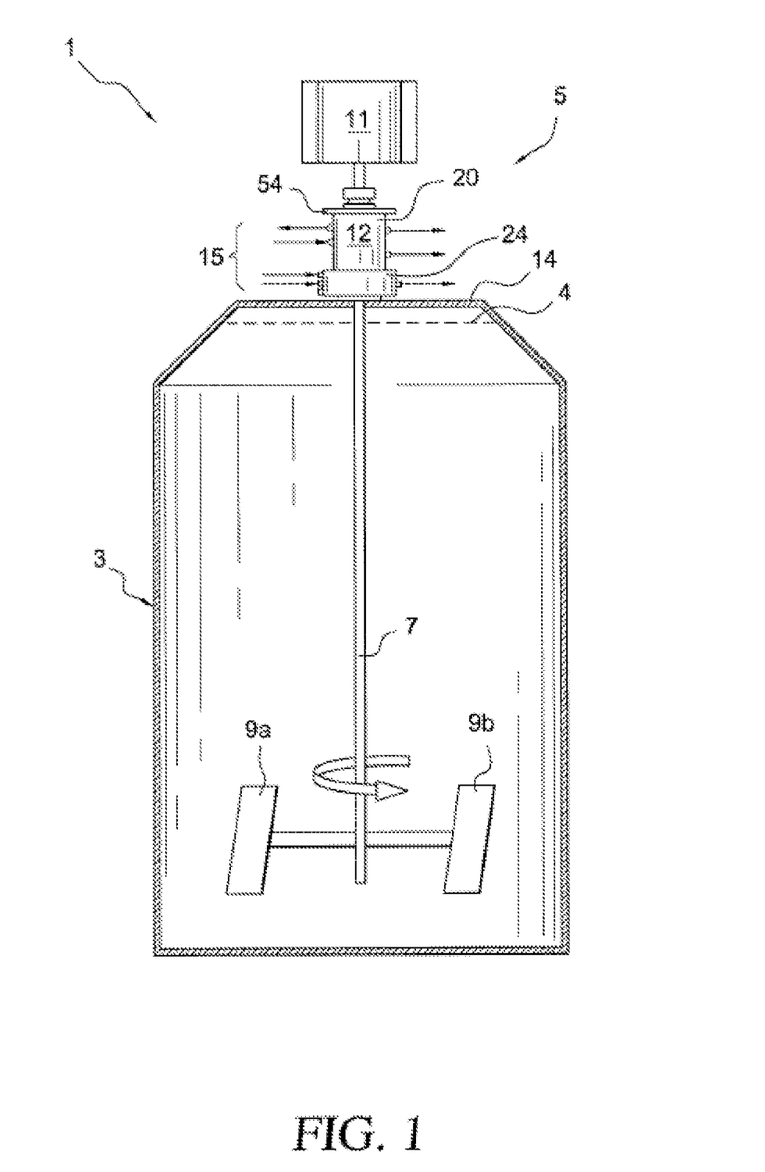
FIG. 1 is a partial side cross sectional view of the stirred tank polymerization reactor of the invention.

With reference now to FIG. 1, wherein like numbers designate like components throughout all of the various figures, the stirred tank polymerization reactor 1 of the invention includes a reactor tank 3 that contains a mixture 4 of catalyst, monomers and a polymer reaction product under an elevated pressure and temperature. For example, the monomers may be a mixture of ethylene, $C_3$-$C_8$ alpha olefins, and a non-conjugated diene, and the polymer reaction product may be ethylene-propylene-diene (EPDM) elastomers. Preferably, the reaction is an adiabatic, metallocene-catalytic reaction, such as at a temperature about 300° F.-700° F. (about 149° C.-371° C.), preferably about 400° F.-600° F. (about 204° C.-316° C.), more preferably about 400°-500° F. (204° C.-260° C.). Preferably, the reaction is at an elevated pressure, such as at pressure of at least about 80 bars, about 100 bars-160 bars, preferably about 120-140 bars, more preferably about 120 bars-130 bars, and even more preferably about 126 bars. During the operation of the reactor 1, monomers are continuously introduced into the tank while reaction product is continuously withdrawn via monomer inlets and product outlets not shown in the figures. The reactor 1 further includes a stirring assembly 5 that continuously circulates the mixture 4 of monomers and reaction product throughout the tank to promote a uniform polymerization reaction throughout the mixture 4. In the exemplified embodiment, the stirring assembly 5 includes a rotatable shaft 7 connected to a pair of stirring paddles 9a, 9b at one end and an electric motor and transmission assembly 11 at the other end. A mechanical seal 12 rotatably and sealingly mounts the shaft 7 into the top wall 14 of the tank 3 as shown. Various inlets and outlets of the mechanical seal 12 are connected to a fluid circulation system 15 that supplies high and low pressure barrier fluid and liquid coolant to the seal in a manner described in detail hereinafter. As will be described in detail hereinafter, the seal 12 includes lower and upper fluid barrier seal assemblies 16 and 18, respectively (as indicated in FIG. 2).

Figure 2:
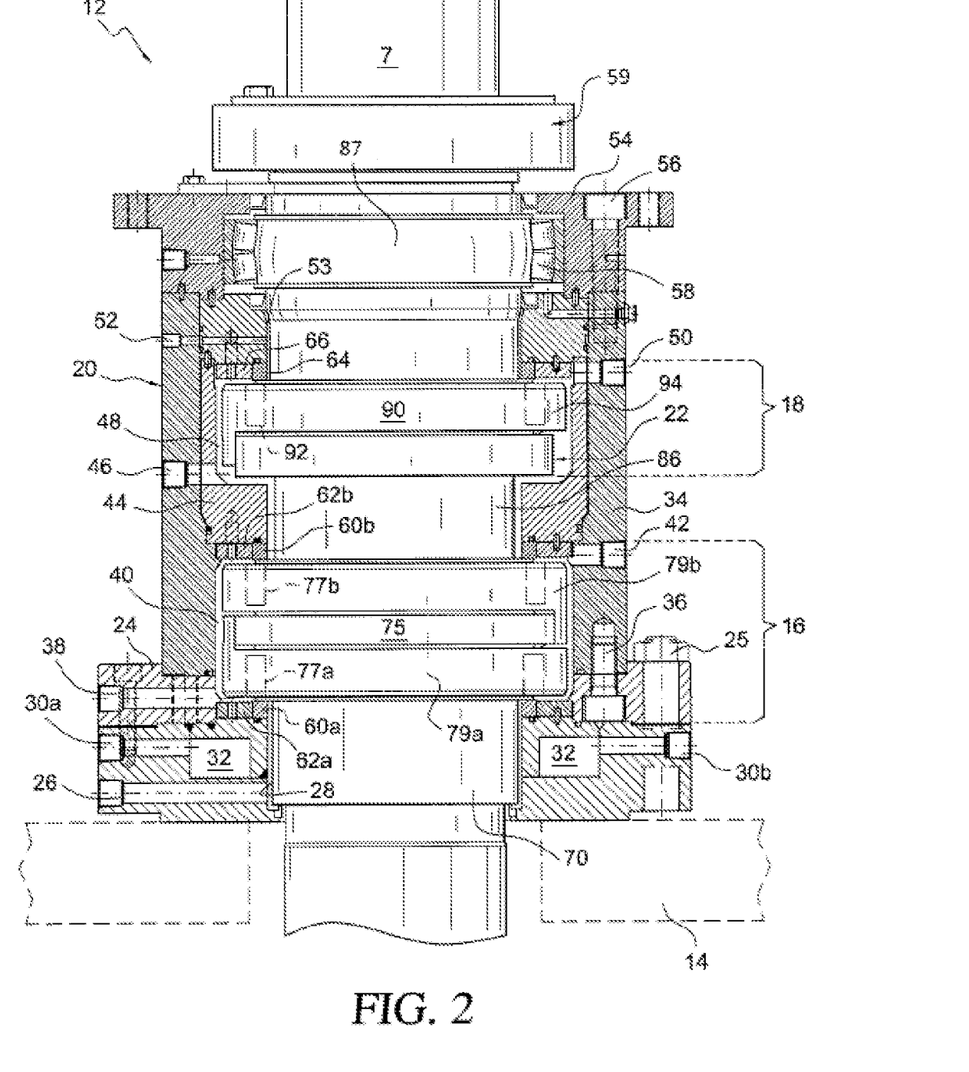
FIG. 2 is a partial side cross sectional view of the mechanical seal of the stirred tank polymerization reactor of FIG. 1, illustrating a side view of the rotating inner cylinder of the seal within a cross section of the stationary outer cylinder of the seal.
Figure 3:
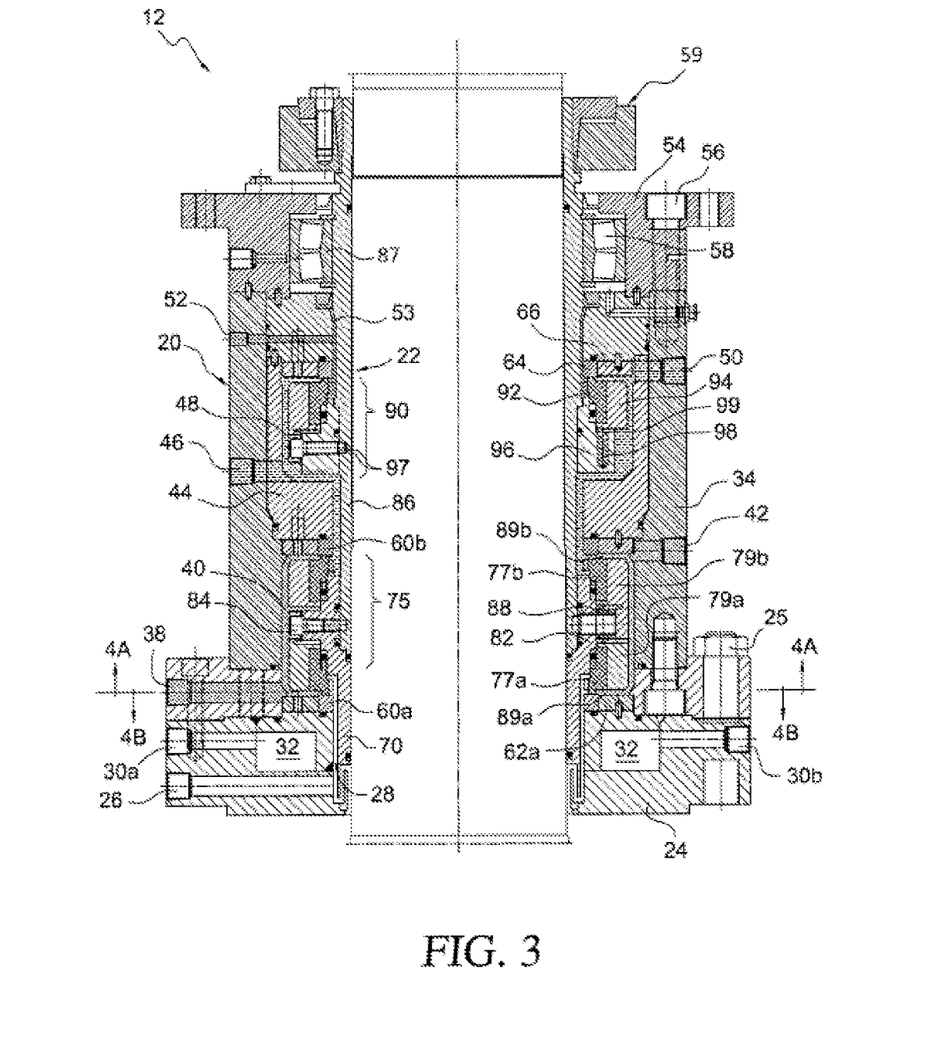
FIG. 3 is a side cross sectional view of both the inner and outer cylinders of the mechanical seal used in the polymerization reactor illustrated in FIG. 1 illustrating in particular the flow paths of the high and low pressure barrier fluids used in the seal.

With reference now to FIGS. 2 and 3, the mechanical seal 12 generally comprises a stationary outer cylinder 20 (sometimes referred to as the seal "stator" in the art) that contains a rotatable inner cylinder 22 (sometimes referred to as the seal "rotor" in the art). Outer cylinder 20 includes a bottom mounting flange 24 that is secured on to the top wall 14 of the tank 3 via bolts 25. Inner cylinder 22 is attached to the rotating shaft 7 of the stirring assembly by way of a driving sleeve and collet assembly described in detail hereinafter.

The bottom mounting flange 24 of the outer cylinder 20 includes a radially-oriented vent outlet 26. The inner end of the vent outlet 26 is connected to an annular passageway 28 defined between the inner diameter of the flange 24, and the outer diameter of a driving sleeve that circumscribes the rotating shaft 7. The outer end of the vent outlet 26 is connected to the fluid circulation system 15. In operation, outlet 26 allows air and gas from the reactor tank 3 to be vented from the tank 3 so that the annular passageway 28 conducts liquid from the mixture 4 within the tank 3 to the first sealing interface of the seal 12. Without the vent outlet 26, annular passageway 28 could become vapor-locked. The bottom mounting flange 24 further includes a radially-oriented coolant inlet 30a and coolant outlet 30 b, both of which are connected at their inner ends to an annular, closed loop coolant passageway 32. Inlet and outlet 30a, 30b are connected at their outer ends to source of circulating coolant which forms part of the fluid circulation system 15. The location of the coolant passageway 32 near the bottom of the seal 12 between the tank 3 and the lowermost sealing interfaces allows it to effectively protect these interfaces from overheating during the operation of the reactor.

The outer cylinder 20 of the seal 12 further includes an outer housing 34 mounted over the upper surface of the bottom mounting flange via bolts 36. An annular flow path 40 for high pressure barrier fluid is defined between the inner diameter of the outer housing 20 and the outer diameter of the inner cylinder 22 contained within it. High pressure barrier fluid from the fluid circulation system 15 is conducted into the annular flow path 40 via a radially-oriented high pressure barrier fluid inlet 38 located in the bottom mounting flange 24, while this fluid is conducted out of the annular flow path 40 and back to the circulation system 15 via a radially-oriented high pressure barrier fluid outlet 42 located in the outer housing. An inner housing 44 is provided around the inner diameter of the upper portion of the outer housing 34 as shown. An annular flow path 48 for low pressure barrier fluid is defined between the inner diameter of the inner housing 44 and the outer diameter of the inner cylinder 22 contained within it. Low pressure barrier fluid from the fluid circulation system 15 is conducted into the annular flow path 48 via a radially-oriented low pressure barrier fluid inlet 46 that extends through both the outer and inner housings 34 and 44. Low pressure barrier fluid is conducted out of the annular flow path 48 and back to the circulation system 15 via a radially-oriented low pressure barrier fluid outlet 50 that likewise extends through both the outer and inner housings 34 and 44. A drain outlet 52 further connects an additional annular flow path 53 with the fluid circulation system and serves to drain low pressure barrier fluid that flows through the uppermost sealing interface of the seal 12.

The outer cylinder 20 of the seal 12 is capped by an upper mounting flange 54 secured to the outer housing 34 via bolts 56. The upper mounting flange 54 contains a roller bearing assembly 58 that rotatably mounts the inner cylinder 22 of the seal 12 to the outer cylinder 20. A collet assembly 59 provided above the upper mounting flange 54 secures the rotating shaft 7 of the stirring assembly 4 to the inner cylinder 22 of the seal 12.

Finally, the outer cylinder 20 of the seal includes lower annular sealing seats 60a, 60b which forms half of the lower fluid barrier seal assembly 16. Annular sealing seats 60a, 60b are secured to the bottom mounting flange 24 and inner housing 44 respectively by seat mounting rings 62a, 62b. A single upper annular sealing seat 64 which forms half of the upper fluid barrier seal assembly 18 is secured to the inner housing 44 by seat mounting ring 66. Sealing seats 60a, 60b, and 64 are preferably formed from a hard ceramic material such as carbide. As will be described in detail later, the sealing seats 60a, 60b, and 64 have flat sealing faces which engage complementary-shaped flat faces of sealing rings mounted in the rotating inner cylinder 22 to form the three sealing interfaces of the seal 12.

With reference now to FIG. 3, the inner cylinder 22 of the seal 12 includes a driving sleeve 70 at its lower end that is connected to the rotatable shaft 7. The outer surface of the driving sleeve 70 defines the inner surface of the previously described tank contents annular passageway 28. The upper end of the driving sleeve 70 is incorporated into a lower sealing ring assembly 75 which forms the other half of the lower fluid barrier seal assembly 16. Lower sealing ring assembly 75 includes lower sealing rings 77a, 77b. These rings 77a, 77b are mounted in sealing ring holders 79a, 79b which are in turn connected to a flange 82 of the driving sleeve 70 via bolts 84. While the connection between the sealing ring holders 79a, 79b and the flange 82 of the driving sleeve 70 compels the sealing ring holders 79a, 79b (and hence the sealing rings 77a, 77b) to rotate with the flange 82 when shaft 7 turns, it also allows for a small degree of axial movement of the sealing rings 77a, 77b relative to their respective sealing seats 60a and 60b. The upper portion of the drive sleeve 70 overlaps a shaft sleeve 86 that surrounds the rotating shaft 7 throughout the upper portion of the seal 12. An annular bearing race 87 is mounted around the shaft sleeve 86 and forms part of the previously mentioned roller bearing assembly 58. A plurality of coiled compression springs 88 are provided between the lower sealing ring holders 79a, 79b to resiliently engage the lower sealing rings 77a, 77b against their respective sealing seats 60a, 60b. It is important to note that annular spaces 89a, 89b are provided behind the sealing ring holders 79a, 79b. These spaces 89a, 89b communicate with the annular flow path 40. Such a structure allows high pressure barrier fluid admitted to the annular flow path 40 to exert pressure behind the sealing ring holders 79a, 79b which, like the springs 88, will act to push the sealing rings 77a, 77b into engagement with their respective sealing seats 60a, 60b.

With further reference to FIG. 3, the inner cylinder 22 of the seal 12 also has an upper sealing ring assembly 90 that forms the other half of the of the upper fluid barrier seal assembly 18. Assembly 90 includes an upper sealing ring 92 mounted in an upper sealing ring holder 94. The sealing ring holder 94 is in turn connected to a drive flange 96 affixed to the shaft sleeve 86 via bolts 97. The connection between the holder 94 and the flange 96 compels the holder 94 (and hence the sealing ring 92) to rotate with the flange 96 when shaft 7 turns, but also allows for a small degree of axial movement of the sealing ring 92 relative to its respective sealing seat 64. Similar to the lower sealing ring assembly 75, springs 98 are provided between the sealing ring holder 94 and the flange 96 to resiliently engage the upper sealing ring 92 against its respective sealing seat 64. Additionally, an annular space 99 is provided behind the sealing ring holder 94. This annular space 99 communicates with the annular flow path 48. Such a structure allows low pressure barrier fluid admitted to the annular flow path 48 to exert pressure behind the sealing ring holder 94 to push the sealing ring 92 into its respective sealing seat 64, thereby complementing the function of the springs 98.

Figure 4A:
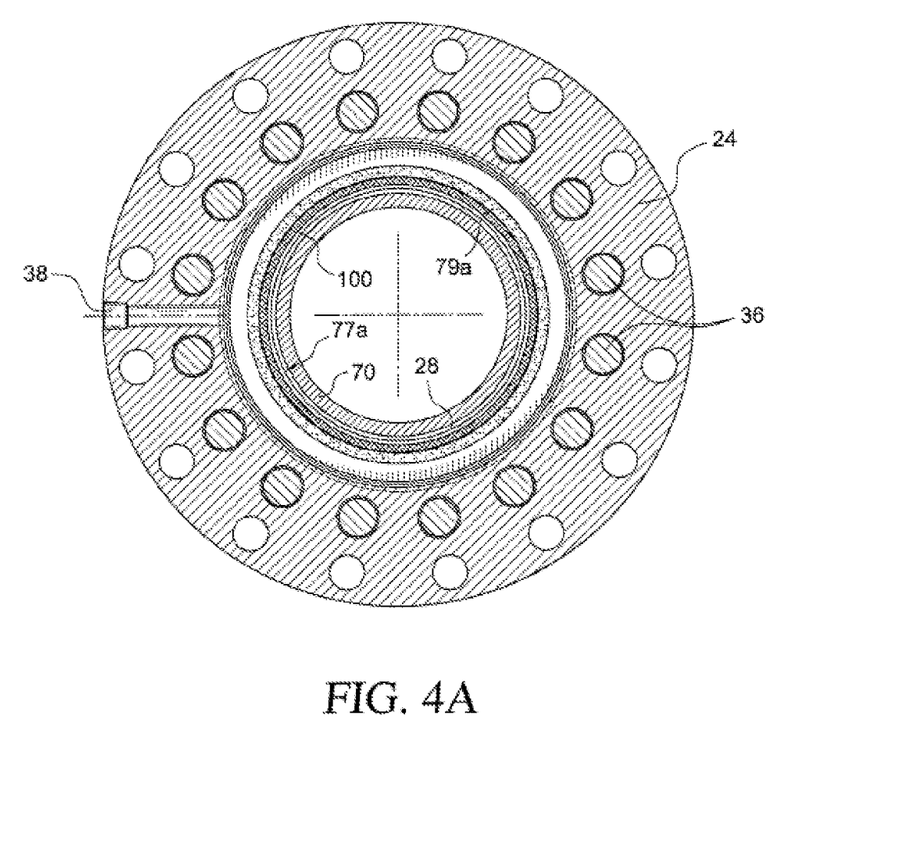
FIGS. 4A and 4B are cross sectional views of the seal of FIG. 3 taken along the lines 4A and 4B showing an annular sealing ring and an annular sealing seat of the seal, respectively.
Figure 4B:
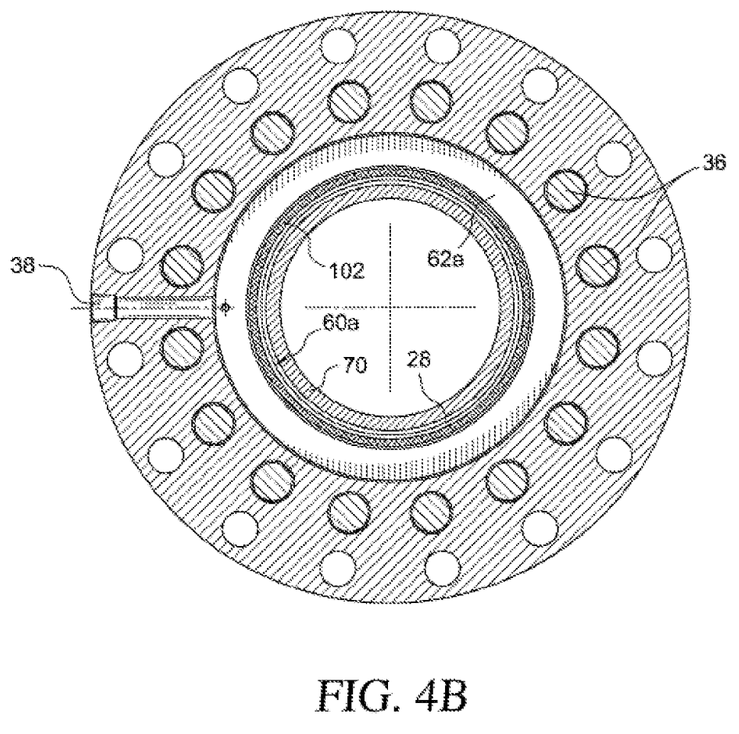

The interface defined by the contact between the sealing rings 77a, 77b and 92 against their respective sealing seats 60a, 60b and 64 is best seen with respect to FIGS. 4A and 4B. As illustrated in FIG. 4A, each of the sealing rings 77a, 77b and 92 includes a flat, annular sealing face 100. As illustrated in FIG. 4B, each of the sealing seats 60a, 60b and 64 includes a flat, annular seat face 102. Both the sealing seats 60a, 60b and 64 and the sealing rings 77a, 77b and 92 are preferably formed from a hard ceramic material such as carbide wherein the seal and seat faces 100, 102 are ground flat to within a few nanometers. Such tight flatness tolerances reduce both friction and leakage in the interfaces defined between the seal and seat faces 100, 102 during the operation of the mechanical seal 12.

Figure 5:
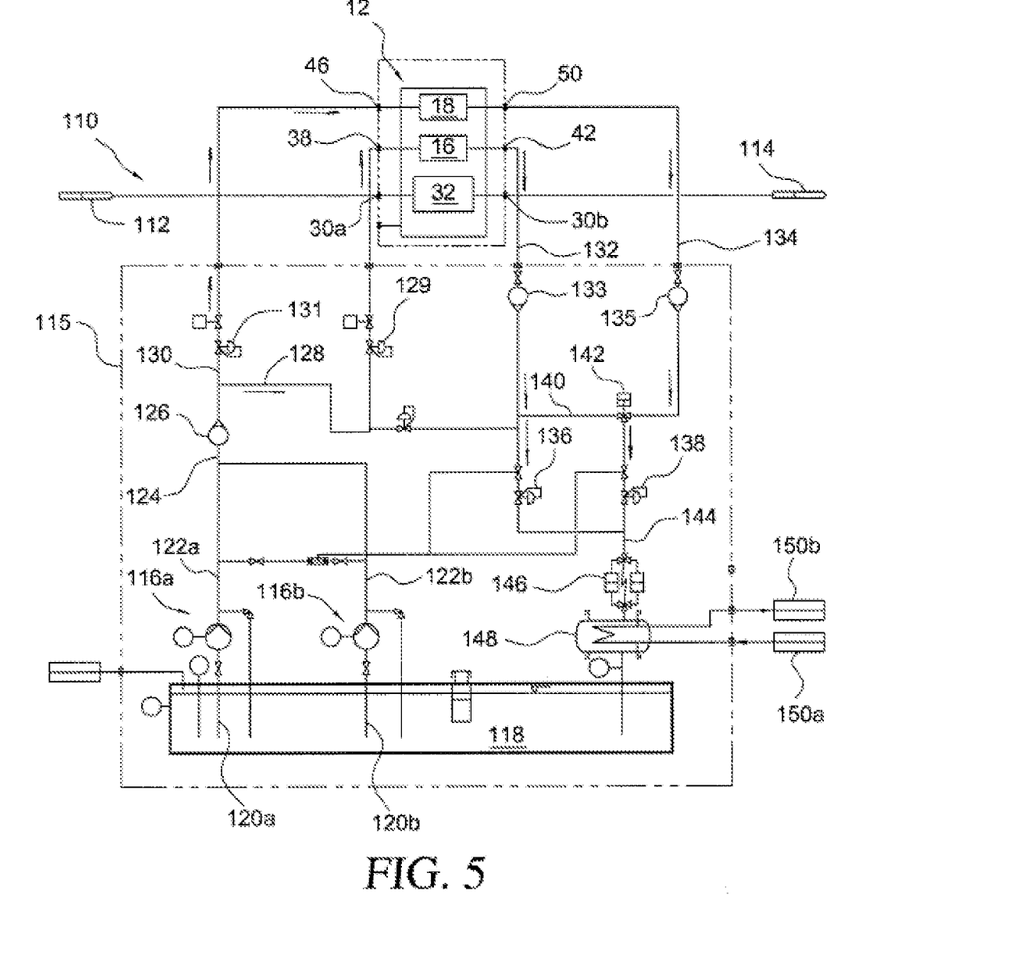
FIG. 5 is a schematic diagram of the fluid circulation system connected to the mechanical seal illustrated in FIGS. 1-3 that supplies the seal with high and low pressure barrier fluid and circulating coolant.

FIG. 5 illustrates the circulation system 15 that is connected to the previously described inlets and outlets of the mechanical seal 12. The system 15 includes a coolant circulator 110 having a coolant source 112 connected to the coolant inlet 30a of the seal 12 and a coolant return 114 connected to the coolant outlet 30b. While not shown in the figure, the coolant circulator also includes a refrigeration unit, a pump, a flow meter and a flow regulating valve to ensure that the temperature and flow rate of the coolant (which is preferably water) is sufficient to maintain the temperature of the lower portion of the seal 12 at a level that avoids premature wear in particular to the lower sealing rings 77a, 77b and their respective sealing seats 60a, 60b.

The system 15 also includes a barrier fluid circulator 115 including a pair of barrier fluid pumps 116a, 116b for providing pressurized barrier fluid (which is preferably formed from mineral oil) to the lower and upper barrier fluid seal assemblies 16 and 18. The two pumps 116a and 116b are provided for redundancy in the event that one of the pumps fails. Consequently, during normal operation, only one of the two pumps operates. Each of the pumps 116a, 116b is connected on its inlet side to a barrier fluid reservoir 118 via inlet pipes 120a, 120b, while the outlet sides of the pumps 116a, 116b are connected to outlet pipes 122a, 122b, respectively. Outlet pipes 122a and 122b are connected to a main outlet pipe 124 as shown. Outlet pipe 124 includes a flowmeter 126 whose output is continuously relayed to a digital controller (not shown). Outlet pipe 124 bifurcates into high and low pressure fluid outlet pipes 128 and 130, each of which has a flow control valve 129 and 131, respectively. The high and low pressure barrier fluid inlets 38 and 46 of the mechanical seal 12 are connected to the high and low pressure barrier fluid outlet pipes 128 and 130, respectively, while the high and low pressure barrier fluid outlets 42 and 50 are connected to high and low pressure outlet pipes 132 and 134. Outlet pipes 132 and 134 both include flowmeters 133 and 135 and pressure control valves 136 and 138 as shown, all of which are connected to the aforementioned digital controller (not shown). Additionally, bridging pipe 140 connects the high pressure outlet pipe 132 to the low pressure outlet pipe 134 by way of a three-way valve 142. Three way valve 142 is normally positioned open from pipe 134 to pipe 144 and closed from pipe 134 to pipe 140 for the purpose of maintaining a pressure differential between the barrier fluid flowing through outlets 42 and 50. Three way valve 142 opens the bridging pipe 140 only under seal failure conditions, which are described hereinafter. Outlet pipes 132, 134 converge into a main return pipe 144 that includes a barrier fluid filter assembly 146 and cooler 148 having a coolant source 150a and coolant return 150b.

In operation, the reactor 1 continuously produces a polymer reaction product 4 within the tank 3 at temperatures of between about 400°-500° F. (204° C.-260° C.) and at pressures of about 126 bars. During such production, the shaft 7 of the stirring assembly 5 continuously rotates to stir the reaction product 4, which in turn rotates the inner cylinder 22 of the mechanical seal 12 relative to the stationary outer cylinder 20.

To prevent overheating of the lowermost seal in the fluid barrier seal assembly 16, coolant circulator 110 continuously circulates a flow of coolant through the annular closed loop passageway 32 via coolant inlet and outlets 30a, 30b. In contrast to the seal flush designs associated with the prior art, the use of a closed loop passageway 32 allows a large flow of coolant to circulate through the portion of the seal 12 closest to the reactor tank 3 without any danger of contaminating the reaction product 4.

To prevent the reaction product 4 from leaking through the mechanical seal 12, the barrier fluid circulator 115 simultaneously supplies pressurized barrier fluid to the inlets 38 and 46 of the lower and upper fluid barrier seal assemblies 16 and 18. The presence of three fluid barrier seals in the upper and lower fluid seal assemblies 16 and 18 (in contrast to the two fluid barrier seals used in the prior art) advantageously reduces the pressure load experienced by the fluid seals as the pressure load is divided over a larger number of fluid seals. As a result of the pressure control provided by the valves 136 and 138, the pressure of the barrier fluid flowing through the uppermost fluid seal in the lower seal assembly 16 via the inlet 38 and outlet 42 is maintained at a value that is twice as high as the pressure of the fluid flowing through the upper seal assembly 18 via inlet 46 and outlet 50. Such a balance in pressure evenly divides the pressure load experienced by the top two fluid barrier seals included within the assemblies 16 and 18.

The pressure of the barrier fluid flowing through the lower seal assembly 16 via inlet 38 and outlet 42 is preferably set via pressure valve 136 to a value no more than about 20% larger than the internal pressure of the reactor tank 3, and more preferably about 10% larger than this pressure. Accordingly, if the pressure of the reactor tank were 126 bars, the pressure of the barrier fluid flowing through inlet 38 and outlet 42 would be set to 144 bars. The resulting pressure difference would ensure that tank product 4 present in the lower annular path 28 of the stationary outer cylinder 20 is effectively confined by the high pressure barrier fluid circulating through the opposing annular flow path 40. At the same time, the pressure differential experienced by the lowermost sealing seat and ring 60a, 77a, would only be about 12 bars, while the pressure differential experienced by the middle and upper sealing seats and rings 60b, 77b and 64, 92 would be evenly balanced at 72 bars apiece. Such even balance occurs since the middle sealing seat and ring 60b, 77b, experiences the pressure differential between the high and low fluid barrier sources via opposing annular paths 40 and 48, while the upper sealing seat and ring experiences the pressure differential between the low pressure barrier fluid and ambient pressure via opposing annular paths 48 and 53.

In the event of a failure between the middle sealing seat 60b and the middle sealing ring 77b, the three way valve 142 is positioned such that the barrier fluid to the upper barrier fluid seal assembly 18 operates at a higher pressure differential (i.e., between 144 bars of the higher pressure barrier fluid and atmospheric pressure) thus, maintaining a pressurized double seal arrangement. In the event of a seal failure of the lower sealing seat 60a and lower sealing ring 77a, the middle and upper seals operate as tandem seals and barrier fluid flow to the lower barrier fluid seal assembly 16 is shut off to prevent continued barrier fluid leakage into the reactor 1. In the event of a failure of the upper sealing seat 64 and upper sealing ring 92, the barrier fluid flow to the upper barrier seal assembly 18 is shut off to prevent loss of barrier fluid through outlet vent 52 thus maintaining a double seal arrangement with only barrier fluid sealing assembly 18 in operation. Each of these three failure scenarios allows continued operation of the reactor 1 until an opportunity arises to shut down the reactor 1 and to replace the failed components. These fault tolerant features provided by the combination of the triple fluid barriers of the mechanical seal 12 and the flexibility of the fluid circulation system 15 provide additional substantial advantages over prior art double seal designs.

Additionally, the superior cooling provided by the closed loop coolant passageway 32, and the reduction of mechanical forces applied to sealing seats and rings resulting from the use of three (as opposed to two) fluid barrier seals in the seal 12 greatly protracts the lifespan of the sealing seats 60a, 60b, 64 and sealing rings 77a, 77b, 92 such that the mechanical seal 12 can operate for years instead of months without failure.

The invention can be especially useful for copolymerization reactions involving the polymerization of one or more of the monomers, for example alpha-olefin monomers of ethylene, propylene, butene-1, pentene-1 1,4-methylpentene-1, hexene-1, octene-1, decene-1 and cyclic olefins such as styrene. Other monomers can include polar vinyl, dienes, norbornene, acetylene, and aldehyde monomers.

In the case of elastomers, the polymer which may be produced include terpolymers of an ethylene-α-olefin-EODE (Ethylene-alpha-Olefin-Diene Elastomer) of high $M_w$ and greater than 0.3 weight % diene content, preferably greater than 2.0 weight % diene content. These polymers may be largely amorphous and have a low or zero heat of fusion. As used herein the term "EODE" encompasses elastomeric polymers comprised of ethylene, an α-olefin, and one or more non-conjugated diene monomers. The non-conjugated diene monomer can be a straight chain, branched chain or cyclic hydrocarbon diene having from 6 to 15 carbon atoms. Examples of suitable non-conjugated dienes are straight chain acyclic dienes such as 1,4-hexadiene and 1,6-octadiene; branched chain acyclic dienes such as 5-methyl-1,4-hexadiene; 3,7-dimethyl-1,6-octadiene; 3,7-dimethyl-1,7-octadiene and mixed isomers of dihydromyrcene and dihydroocinene; single ring alicyclic dienes such as 1,4-cyclohexadiene; and 1,5-cyclododecadiene; and multi-ring alicyclic fused and bridged ring dienes such as tetrahydroindene, methyl tetrahydroindene, dicyclopentadiene; bicyclo-1 5 (2,2,1)-hepta-2,5-diene; alkenyl, alkylidene, cycloalkylidene norbornenes such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene.

Of the dienes typically used to prepare EPDMs, the particularly preferred dienes are, 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD). The preferred EOD elastomers may contain 20 up to 90 weight % ethylene, more preferably 30 to 85 weight % ethylene, most preferably 35 to 80 weight % ethylene. The alpha-olefin suitable for use in the preparation of elastomers with ethylene and dienes are preferably propylene, 1-butene, 1-pentene, 1-hexene, 1-octene and 1-dodecene. The alpha-olefin is generally incorporated into the EODE polymer at 10 to 80 weight %, more preferably at 20 to 65 weight %. The non-conjugated dienes are generally incorporated into the EODE at 0.5 to 20 to 35 weight %; more preferably at 1 to 15 weight %, and most preferably at 2 to 12 weight %. If desired, more than one diene may be incorporated simultaneously, for example HD and ENB, with total diene incorporation within the limits specified above.

Processes for making EPDM are further described, for example, in U.S. Pat. Nos. 3,726,843 and 6,881,800, and EP552945, incorporated herein by reference in their entirety. Further details relating to EPDM for which this invention may be useful can be found, for example, in U.S. Pat. Nos. 7,915,354; 7,585,917; 7,135,533; 6,806,336; and 6,329,477, incorporated herein by reference in their entirety.

While the invention has been described in detail with particular reference to certain preferred embodiments thereof, it will be understood that variations and modifications can be effected within the spirit and scope of the invention, which is limited only by the appended claims and equivalents thereof.

The present invention can be further described as follows:

Embodiment 1

A stirred tank polymerization reactor system comprising:
a tank;
a stirring assembly including a rotatable shaft that extends through a wall of the tank;
a seal including an outer cylinder mounted in the wall of the tank, an inner cylinder that is rotatable relative to the outer cylinder and connected to the shaft, and first, second, and third fluid barrier seals mounted between the outer and inner cylinder at different positions along the axis of rotation of the inner cylinder with the first fluid barrier seal being closest to the tank interior; and
first and second sources of pressurized barrier fluid connected between said first and second pressure fluid barrier seals and said second and third barrier seals, respectively,
wherein the first barrier fluid source supplies barrier fluid at a higher pressure than a maximum pressure within the tank, and said second barrier fluid source supplies barrier fluid at about 40%-60% (preferably about 45-55%, or about 50%) of the pressure of the first barrier fluid, preferably such that sealing friction forces applied to the second and third fluid barrier seals are substantially equal.

Embodiment 2

The stirred tank polymerization reactor system defined in embodiment 1, wherein the first barrier fluid source supplies barrier fluid at a pressure that is no more than about 20% higher than the pressure within the tank.

Embodiment 3

The stirred tank polymerization reactor system defined in embodiment 1 or 2, further including a cooling channel in said outer cylinder, and a source of cooling fluid connected to said channel.

Embodiment 4

The stirred tank polymerization reactor system defined in any of embodiments 1-3, wherein said cooling channel is a closed loop channel and said cooling fluid source circulates cooling fluid through said closed loop cooling channel.

Embodiment 5

The stirred tank polymerization reactor system defined in any of embodiments 1-4, wherein said closed loop cooling channel at least partially circumscribes said outer cylinder and is located on an end of the outer cylinder closest to the interior of the tank.

Embodiment 6

The stirred tank polymerization reactor system defined in any of embodiments 1-5, wherein each of the first, second, and third fluid barrier seals includes an inner edge that faces said shaft, and an outer edge that faces away from said shaft.

Embodiment 7

The stirred tank polymerization reactor system defined in any of embodiments 1-6, wherein the reactor system includes a first passageway that conducts pressured fluid from said tank to the inner edge of the first fluid barrier seal, and a second passageway that conducts barrier sealing fluid from said first source to the outer edge of the first fluid barrier seal and the outer edge of the second fluid barrier seal.

Embodiment 8

The stirred tank polymerization reactor system defined in any of embodiments 1-7, wherein the reactor system includes a third passageway that conducts pressured fluid from said second source to the inner edge of the second fluid barrier seal, and to the outer edge of the third fluid barrier seal.

Embodiment 9

The stirred tank polymerization reactor system defined in any of embodiments 1-8, wherein the reactor system includes a fourth passageway that conducts pressurized barrier fluid from the second source of pressurized barrier fluid from the inner surface of the third fluid barrier seal to a drain passageway that recycles the barrier fluid back to the first and second pressurized sources.

Embodiment 10

The stirred tank polymerization reactor system defined in any of embodiments 1-9, wherein each of the first, second, and third fluid barrier seals includes an annular sealing ring and an annular sealing seat, wherein the annular sealing ring rotates along with the shaft relative to the annular sealing seat and is spring biased into engagement against said seat.

Embodiment 11

A stirred tank polymerization reactor system comprising:
a tank;
a stirring assembly including a rotatable shaft that extends through a wall of the tank;
a seal including an outer cylinder mounted in the wall of the tank, an inner cylinder that is rotatable relative to the outer cylinder and connected to the shaft, and first, second, and third fluid barrier seals mounted between the outer and inner cylinder at different positions along the axis of rotation of the inner cylinder with the first fluid barrier seal being closest to the tank interior;
first and second sources of pressurized barrier fluid connected between said first and second pressure fluid barrier seals and said second and third barrier seals, respectively, wherein the first barrier fluid source supplies barrier fluid at a higher pressure than a pressure within the tank and said second barrier fluid source supplies barrier fluid at about 40%-60% (preferably about 45-55%, or about 50%) of the pressure of the first barrier fluid, preferably such that sealing friction forces applied to the second and third fluid barrier seals are substantially equal, and a closed loop cooling channel at least partially circumscribing the outer cylinder that is connected to a source of cooling fluid that circulates said cooling fluid through said cooling channel.

Embodiment 12

The stirred tank polymerization reactor system defined in embodiment 11, wherein the first barrier fluid source supplies barrier fluid at a pressure that is no more than about 20% higher than the pressure within the tank.

Embodiment 13

The stirred tank polymerization reactor system defined in embodiment 11 or 12, wherein said closed loop cooling channel at least partially circumscribes said outer cylinder and is located on an end of the outer cylinder closest to the interior of the tank.

Embodiment 14

The stirred tank polymerization reactor system defined in any of embodiments 11-13, wherein each of the first, second, and third fluid barrier seals includes an inner edge that faces said shaft, and an outer edge that faces away from said shaft.

Embodiment 15

The stirred tank polymerization reactor system defined in any of embodiments 11-14, wherein the reactor system includes a first passageway that conducts pressured fluid from said tank to the inner edge of the first fluid barrier seal, and a second passageway that conducts barrier sealing fluid from said first source to the outer edge of the first fluid barrier seal and the outer edge of the second fluid barrier seal.

Embodiment 16

The stirred tank polymerization reactor system defined in any of embodiments 11-15, wherein the reactor system includes a third passageway that conducts pressured fluid from said second source to the inner edge of the second fluid barrier seal, and to the outer edge of the third fluid barrier seal.

Embodiment 17

The stirred tank polymerization reactor system defined in any of embodiments 11-16, wherein the reactor system includes a fourth passageway that conducts pressurized barrier fluid from the second source of pressurized barrier fluid from the inner surface of the third fluid barrier seal to a drain passageway that recycles the barrier fluid back to the first and second pressurized sources.

Embodiment 18

The stirred tank polymerization reactor system defined in any of embodiments 11-14, wherein each of the first, second, and third fluid barrier seals includes an annular sealing ring and an annular sealing seat, wherein the annular sealing ring rotates along with the shaft relative to the annular sealing seat and is spring biased into engagement against said seat.

Embodiment 19

The stirred tank polymerization reactor system defined in any of embodiments 11-18, wherein a same spring biases the annular sealing rings of said first and second barrier fluid seals against their respective annular sealing seats.

Embodiment 20

The stirred tank polymerization reactor system defined in any of embodiments 11-19, wherein the outer cylinder further includes a vent passageway connected to said first passageway.

Embodiment 21

A method for making a polymer comprising the steps of:
(a) reacting monomer in a stirred tank polymerization reactor to form a polymer, wherein the reactor comprises:
 a tank;
 a stirring assembly including a rotatable shaft that extends through a wall of the tank;
 a seal including:
  (i) an outer cylinder mounted in the wall of the tank,
  (ii) an inner cylinder that is rotatable relative to the outer cylinder and connected to the shaft, and
  (iii) first, second, and third fluid barrier seals mounted between the outer and inner cylinder at different positions along the axis of rotation of the inner cylinder with the first fluid barrier seal being closest to the tank interior; and
 first and second sources of pressurized barrier fluid connected between said first and second pressure fluid barrier seals and said second and third barrier seals, respectively,
(b) supplying a first barrier fluid from the first barrier fluid source at a higher pressure than a maximum pressure within the tank; and
(c) supplying a second barrier fluid from the second barrier fluid source at about 40%-60% of the pressure of the first barrier fluid, preferably such that sealing friction forces applied to the second and third fluid barrier seals are substantially equal.

Embodiment 22

The method of embodiment 21, wherein the monomer in step (a) comprises ethylene, propylene, and diene, and the polymer formed in step (d) is a copolymer comprising units derived from ethylene, propylene, and diene.

Embodiment 23

The method of embodiment 21 or 22, wherein the reaction in step (a) is at a pressure of at least about 100 bars.

Embodiment 24

The method of any of embodiments 21-23, wherein the reaction in step (a) is at a temperature of at least about 400° F. (316° C.).

Embodiment 25

The method of any of embodiments 21-24, wherein the reaction in step (a) is at pressure of about 120-140 bars and a temperature of about 400° F.-500° F. (204° C.-260° C.).

What we claim:
1. A stirred tank polymerization reactor system comprising:
 a tank;

a stirring assembly including a rotatable shaft that extends through a wall of the tank;

a seal including an outer cylinder mounted in the wall of the tank, an inner cylinder that is rotatable relative to the outer cylinder and connected to the shaft, and first, second, and third fluid barrier seals mounted between the outer and inner cylinder at different positions along the axis of rotation of the inner cylinder with the first fluid barrier seal being closest to the tank interior; and first and second sources of pressurized barrier fluid connected between said first and second pressure fluid barrier seals and said second and third barrier seals, respectively, wherein the first barrier fluid source supplies barrier fluid at a higher pressure than a maximum pressure within the tank, and said second barrier fluid source supplies barrier fluid at about 40%-60% of the pressure of the first barrier fluid; and wherein the first and second barrier fluid sources each supply barrier fluid at pressures such that sealing friction forces applied to the second and third fluid barrier seals differ by no more than 20% of the higher sealing friction force.

2. The stirred tank polymerization reactor system defined in claim 1, wherein the first barrier fluid source supplies barrier fluid at a pressure that is no more than about 20% higher than the pressure within the tank.

3. The stirred tank polymerization reactor system defined in claim 1, further including a cooling channel in said outer cylinder, and a source of cooling fluid connected to said channel.

4. The stirred tank polymerization reactor system defined in claim 3, wherein said cooling channel is a closed loop channel and said cooling fluid source circulates cooling fluid through said closed loop cooling channel.

5. The stirred tank polymerization reactor system defined in claim 4, wherein said closed loop cooling channel at least partially circumscribes said outer cylinder and is located on an end of the outer cylinder closest to the interior of the tank.

6. The stirred tank polymerization reactor system defined in claim 1, wherein the second barrier fluid source supplies barrier fluid at about 50% of the pressure of the first barrier fluid.

7. The stirred tank polymerization reactor system defined in claim 6, wherein each of the first, second, and third fluid barrier seals includes an inner edge that faces said shaft and an outer edge that faces away from said shaft, and the reactor system includes a first passageway that conducts pressurized fluid from said tank to the inner edge of the first fluid barrier seal, and a second passageway that conducts barrier sealing fluid from said first source to the outer edge of the first fluid barrier seal and the outer edge of the second fluid barrier seal.

8. The stirred tank polymerization reactor system defined in claim 7, wherein the reactor system includes a third passageway that conducts pressurized fluid from said second source to the inner edge of the second fluid barrier seal, and to the outer edge of the third fluid barrier seal.

9. The stirred tank polymerization reactor system defined in claim 8, wherein the reactor system includes a fourth passageway that conducts pressurized barrier fluid from the second source of pressurized barrier fluid from the inner surface of the third fluid barrier seal to a drain passageway that recycles the barrier fluid back to the first and second pressurized sources.

10. The stirred tank polymerization reactor system defined in claim 6, wherein each of the first, second, and third fluid barrier seals includes an annular sealing ring and an annular sealing seat, wherein the annular sealing ring rotates along with the shaft relative to the annular sealing seat and is spring biased into engagement against said seat.

11. A stirred tank polymerization reactor system comprising:

a tank;

a stirring assembly including a rotatable shaft that extends through a wall of the tank;

a seal including an outer cylinder mounted in the wall of the tank, an inner cylinder that is rotatable relative to the outer cylinder and connected to the shaft, and first, second, and third fluid barrier seals mounted between the outer and inner cylinder at different positions along the axis of rotation of the inner cylinder with the first fluid barrier seal being closest to the tank interior;

first and second sources of pressurized barrier fluid connected between said first and second pressure fluid barrier seals and said second and third barrier seals, respectively, wherein the first barrier fluid source supplies barrier fluid at a higher pressure than a pressure within the tank and said second barrier fluid source supplies barrier fluid at about 40%-60% of the pressure of the first barrier fluid, and a closed loop cooling channel at least partially circumscribing the outer cylinder that is connected to a source of cooling fluid that circulates said cooling fluid through said cooling channel; and wherein the first and second barrier fluid sources each supply barrier fluid at pressures such that the sealing friction forces applied to the second and third fluid barrier seals differ by no more than 20% of the higher sealing friction force.

12. The stirred tank polymerization reactor system defined in claim 11, wherein the first barrier fluid source supplies barrier fluid at a pressure that is no more than about 20% higher than the pressure within the tank.

13. The stirred tank polymerization reactor system defined in claim 11, wherein said closed loop cooling channel at least partially circumscribes said outer cylinder and is located on an end of the outer cylinder closest to the interior of the tank.

14. The stirred tank polymerization reactor system defined in claim 11, wherein the second barrier fluid source supplies barrier fluid at about 50% of the pressure of the first barrier fluid.

15. The stirred tank polymerization reactor system defined in claim 14, wherein each of the first, second, and third fluid barrier seals includes an inner edge that faces said shaft and an outer edge that faces away from said shaft, and the reactor system includes a first passageway that conducts pressurized fluid from said tank to the inner edge of the first fluid barrier seal, and a second passageway that conducts barrier sealing fluid from said first source to the outer edge of the first fluid barrier seal and the outer edge of the second fluid barrier seal.

16. The stirred tank polymerization reactor system defined in claim 15, wherein the reactor system includes a third passageway that conducts pressurized fluid from said second source to the inner edge of the second fluid barrier seal, and to the outer edge of the third fluid barrier seal.

17. The stirred tank polymerization reactor system defined in claim 14, wherein each of the first, second, and third fluid barrier seals includes an annular sealing ring and an annular sealing seat, wherein the annular sealing ring rotates along with the shaft relative to the annular sealing seat and is spring biased into engagement against said seat.

18. The stirred tank polymerization reactor system defined in claim 17, wherein a same spring biases the annular sealing rings of said first and second barrier fluid seals against their respective annular sealing seats.

19. A method for making a polymer comprising the steps of:
(a) reacting monomer in a stirred tank polymerization reactor to form a polymer, wherein the reactor comprises:
a tank;
a stirring assembly including a rotatable shaft that extends through a wall of the tank;
a seal including:
(i) an outer cylinder mounted in the wall of the tank,
(ii) an inner cylinder that is rotatable relative to the outer cylinder and connected to the shaft, and
(iii) first, second, and third fluid barrier seals mounted between the outer and inner cylinder at different positions along the axis of rotation of the inner cylinder with the first fluid barrier seal being closest to the tank interior; and
first and second sources of pressurized barrier fluid connected between said first and second pressure fluid barrier seals and said second and third barrier seals, respectively,
(b) supplying a first barrier fluid from the first barrier fluid source at a higher pressure than a maximum pressure within the tank;
(c) supplying a second barrier fluid from the second barrier fluid source at about 40%-60% of the pressure of the first barrier fluid; and
wherein the first and second barrier fluid sources each supply barrier fluid at pressures such that sealing friction forces applied to the second and third fluid barrier seals differ by no more than 20% of the higher sealing friction force.

20. The method of claim 19, wherein the monomer in step (a) comprises ethylene, propylene, and diene, and the polymer formed is a copolymer comprising units derived from ethylene, propylene, and diene.

21. The method of claim 20, wherein the reaction in step (a) is at a pressure of at least about 100 bars.

22. The method of claim 20, wherein the reaction in step (a) is at a temperature of at least about 400° F. (316° C.).

23. The method of claim 20, wherein the reaction in step (a) is at pressure of about 120-140 bars and a temperature of about 400° F.-500° F. (204° C.-260° C.).

* * * * *